(12) United States Patent
Dillenberger

(10) Patent No.: US 10,713,654 B2
(45) Date of Patent: Jul. 14, 2020

(54) ENTERPRISE BLOCKCHAINS AND TRANSACTIONAL SYSTEMS

(71) Applicant: International Business Machines Corporation, Armonk, NY (US)

(72) Inventor: Donna Eng Dillenberger, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 15/002,824

(22) Filed: Jan. 21, 2016

(65) Prior Publication Data
US 2017/0213209 A1    Jul. 27, 2017

(51) Int. Cl.
G06Q 20/38     (2012.01)
G06F 16/23     (2019.01)
G06F 16/27     (2019.01)

(52) U.S. Cl.
CPC ..... *G06Q 20/3829* (2013.01); *G06F 16/2308* (2019.01); *G06F 16/27* (2019.01); *G06Q 20/3825* (2013.01); *G06Q 2220/00* (2013.01)

(58) Field of Classification Search
CPC .......... G06Q 20/3829; G06F 17/30575; G06F 17/30348
See application file for complete search history.

(56) References Cited

U.S. PATENT DOCUMENTS 5,842,212 A * 11/1998 Ballurio ............ G06F 17/30569
2016/0027229 A1   1/2016 Spanos et al.
2016/0342989 A1  11/2016 Davis
2017/0017954 A1 *  1/2017 McDonough .......... G06Q 20/36
2017/0132625 A1 *  5/2017 Kennedy .............. G06Q 20/065
2017/0180134 A1   6/2017 King

OTHER PUBLICATIONS

Dillenberger, D., et al., "A Contrast Between Mainframe Parallel Sysplex Availability and Selected Distributed Computing Availability Solutions", IBM Journal of Research and Development, Sep.-Oct. 2013, pp. 1-14 (Year: 2013).*
How Computers Work, 7th Edition (Year: 2003).*
Dillenberger, D., et al., "A Contrast Between Mainframe Parallel Sysplex Availability and Selected Distributed Computing Availability Solutions", IBM Journal of Research and Development, Sep.-Oct. 2013, pp. 1-14, vol. 57, No. 5.

* cited by examiner

*Primary Examiner* — Zeshan Qayyum
*Assistant Examiner* — Yingying Zhou
(74) *Attorney, Agent, or Firm* — Fleit Intellectual Property Law; Jon Gibbons

(57) ABSTRACT

A system, method, and computer readable storage medium configured for a transactional database management system shared by all computing nodes participating in a system based on a blockchain protocol. The transactional database management system includes transactions and blocks, where the transactions are data to be stored in the blockchain and the blocks are records that confirm when and in what sequence certain transaction became journaled as part of the blockchain. A request is received signed with a signature of a user system to include a new transaction with additional data in the blockchain. In response to the signature being verified and hash of batches of receive transaction into the block being verified. The block are added that records the new transaction with additional data in the blockchain using within the transactional database management system.

19 Claims, 5 Drawing Sheets

ENTERPRISE BLOCKCHAINS AND TRANSACTIONAL SYSTEMS

BACKGROUND

The present invention generally relates to permissionless distributed databases, and more particularly to blockchains.

Currently blockchains are replicated ledgers of transactions that save their data in sequential data files. Transactions are verified in current blockchains by having multiple computer systems hash the data describing a transaction and when a majority of computer systems compute the same hash, the transaction is considered verified and added to the replicated ledgers. Current blockchain protocols elongates the time for transaction verification, as more computer systems participate in replicating the ledger.

SUMMARY

Blockchains or blockchain is a distributed database that keeps a continuously growing list of data records. Each data record is protected against tampering and revisions. Blockchains are used with public ledgers of transactions, where the record is enforced cryptographically. This invention enables transactions using a transactional database management system. For example relational/hierarchical data management systems, customer information control systems, transaction processing facilities that are able to manage concurrent requests to prepare, commit, rollback, save, verify transactions, providing atomicity, consistency, isolation, durability or the option of basically available and eventual consistency to blockchains.

The present invention makes use of transactional database management system's capabilities of massive concurrent prepare, commit, rollback, verification requests to provide scalability, security and availability to blockchains.

As blockchain transactions are initiated using blockchain application interfaces, the transactional data will be managed by transactional database management systems in highly efficient, indexed, in memory buffers that are persisted in multiple ledger storage systems for availability, verification and rollback.

Disclosed is a novel system, computer program product, and method which enables a storing using a blockchain protocol with a transactional database management system. To write additional data in a blockchain, a request is received at a computing node that is communicatively coupled to a transactional database management system. The request is typically cryptographically signed by a user system 306, 308, 310 to include a new transaction with additional data in the blockchain. A new block that records the new transaction with additional data in the blockchain is added to the transactional database management system.

To read the additional data in a blockchain, a request is received at a computing node running a transactional database management system with a transaction identifier from a user system to access data journaled as part of the blockchain in the transactional database. The transactional database management system is searched using the identifier for a corresponding transaction in the blockchain. In response to finding the corresponding transaction in the blockchain, the data is read from the transactional database management system.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
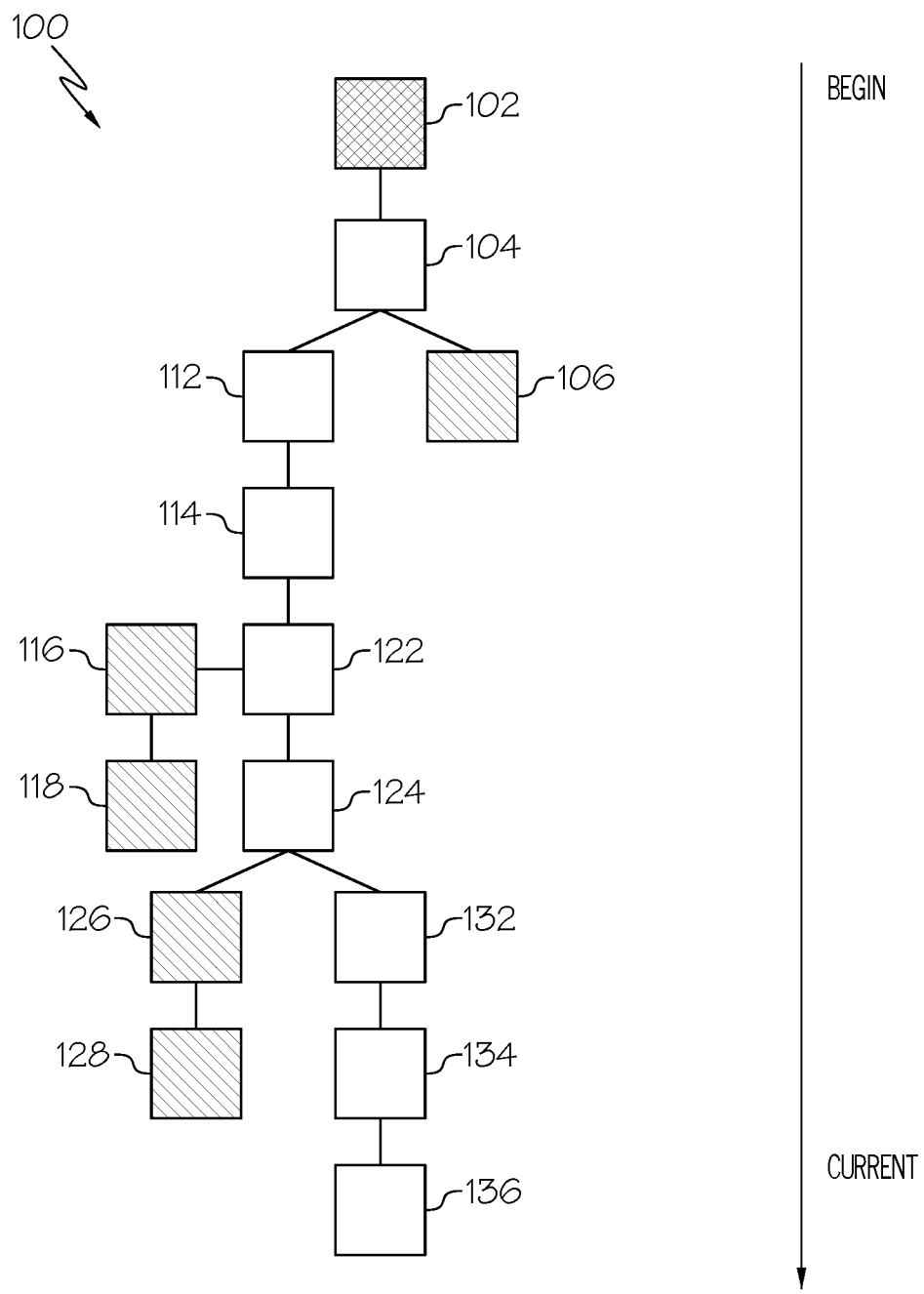
FIG. 1 is a diagram 100 illustrating a simple blockchain.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

Described is a method, data processing system, and computer program product for reading and writing blocks into a block chain using a transactional database management system. Unlike current blockchain systems that use a shared data file, the present system uses a transactional database management system.

Non-Limiting Definitions

The terms "a", "an" and "the" are intended to include the plural forms as well, unless the context clearly indicates otherwise.

The term "blockchain" or "blockchain" is a distributed database that keeps a continuously growing list of data records. Each data record is protected against tampering and revisions. Blockchains are used with public ledgers of transactions, where the record is enforced cryptographically.

The terms "comprises" and/or "comprising", when used in this specification, specify the presence of stated features, steps, operations, elements, and/or components, but do not preclude the presence or addition of one or more other features, integers, steps, operations, elements, components, and/or groups thereof.

The term "computing node" is used to mean computational device with an internal address that can host a copy of a blockchain and the associated transactions.

The term "hash function" is a mathematical algorithm turns an arbitrarily-large amount of data into a fixed-length size. The same hash will always result from the same data, but modifying the data by even one bit will completely change the hash. The values returned by the hash function are called a "hash".

The term "public ledger" is a public accessible listing of transactions for the distributed database or blockchain.

The term "transaction" an agreement that if a condition occurs and then an event will occur. Using a commercial airline example, if the condition is "was payment received for a ticker", then the event is "a reserved ticket is issued." More specifically, transactions are typically a set of conditions that must occur for an event to occur. Likewise if one or more conditions in the set of conditions do not occur, then the event will not occur. Returning to the commercial airline example, if the set of conditions are "was payment received for a ticket" and "the flight is not cancelled", then the event is "a reserved ticket" is issued.

The term "transactional database management system" is a style of computing that enforces the concept of transactions by dividing work into individual, indivisible operations called transactions. Each transaction is treated as coherent, independent of other changes to the transactional database management system, and only commits the new transaction into the transactional database management system if no errors occur otherwise the new transaction is rolled back and not committed into the transactional database management system.

Overview of Blockchain

FIG. 1 is a diagram 100 illustrating a simple blockchain. Blocks in the main chain 102, 104, 112, 114, 122, 124, 132, 134, 136 are the longest series of blocks that go from the beginning block 102 to the current block 136. For any block in the blockchain, there is only one path from the beginning block 102 to the current block 136. Blocks 106, 116, 118, 126, 128 are blocks that are not in the longest chain. Because this is distributed system, blocks 116, 118, 126, 128 are typically created only a few seconds apart from the main chain. Whenever a fork happens, generating computing nodes build onto which ever block is received first in time. Therefore the short chain of blocks 116, 118, 126, 128 not used.

The blockchain 100 implementation consists of two kinds of records: transactions and blocks. Transactions are the actual data stored in the blockchain. As shown the data in each of the blockchain is encrypted as shown graphically by the lock. In one example, the data in each block represents a single transaction. In another example, data in each block represents more than on transaction that is dividable into sections within each block, such as, a music track from a complete CD recording or an image in series of images. Transactions are created by users or participants using the system.

The blocks are recorded that confirm when and in what sequence certain transaction become journaled as back of the blockchain database.

Figure 2:
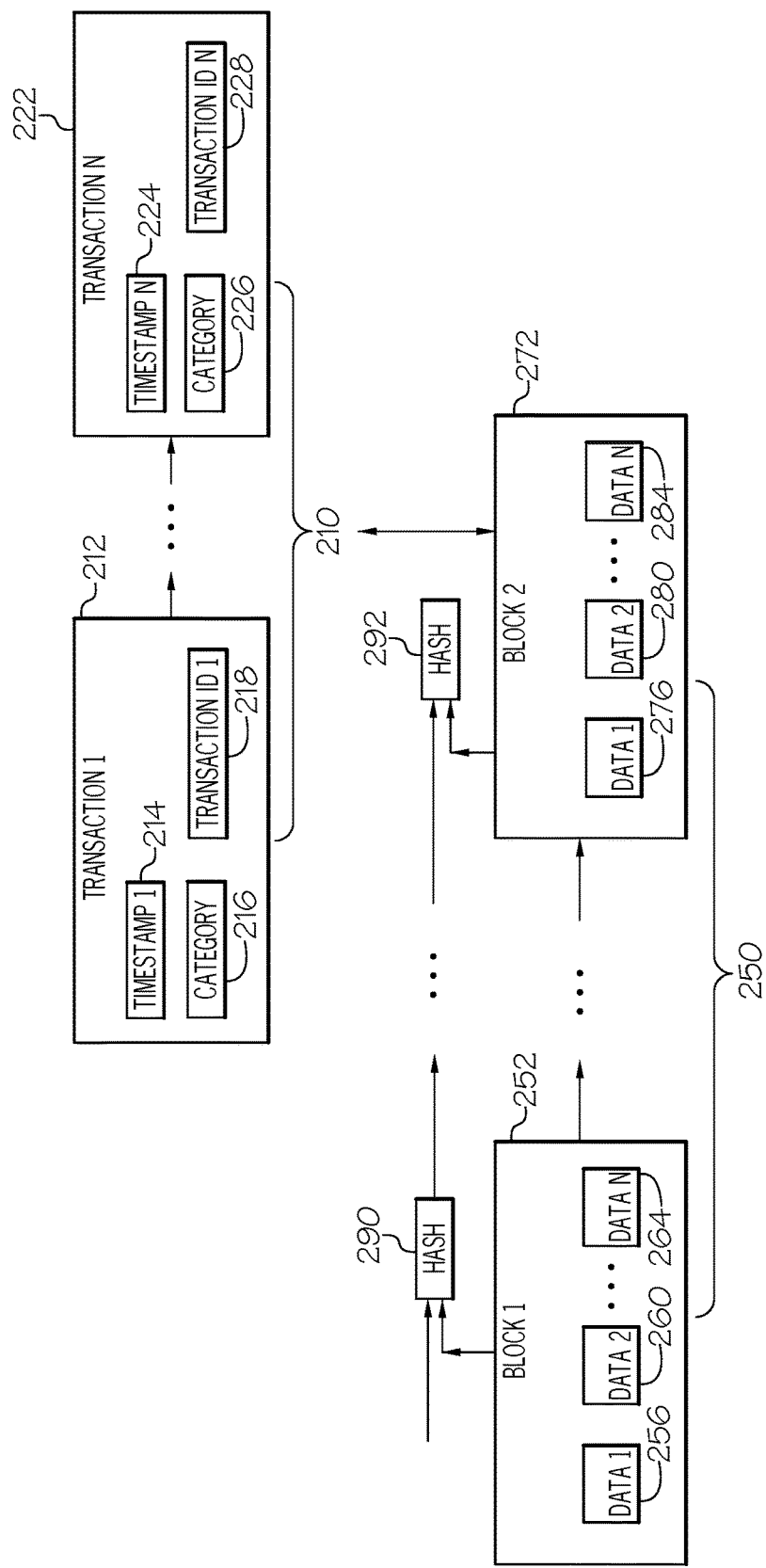
FIG. 2 is a functional diagram illustrating details of each block and transaction in the blockchain of FIG. 1.

FIG. 2 is a functional diagram 200 illustrating details of each block and transaction in the blockchain of FIG. 1. Shown are two kinds of record blocks 210 and transactions 250. The transactions 250 are actual data stored in the blockchain 200. The blocks 210 are records of transactions. In this example transactions 210 are all associated with block 2 272. Other transactions (not shown are associated with block 1 252).

Record blocks 210 represent a series of transactions 212 through 212 as shown for transactions 1 through transaction n respectively. Each block 210 representing a transaction typically includes a timestamp 214, 224 of the transaction. A unique transaction identifier 218, 228 is also shown. This transaction id can be search for a specific item in the transactional database management system. Also shown is an optional category for the transaction 216, such as photo, medical, financial, employment, etc. to associate with the additional data in the transactions 250 described below.

A hash function 290 and 292 is shown as part of the record blocks 210. In one implementation of a blockchain, the previously hash function 290 is input to a subsequent hash function 292, along with the transaction 1 as shown. This ensures that there has been no tampering or alteration of the data in the record blockchain.

Transactions 250 shown in block 1 through block n, (252, 272) contain user or additional data 256, 260, 264, 276, 280, 284. The additional data can represent any multimedia data including text, audio, video, images, financial statements, and more.

Transactional Database Management System

Figure 3:
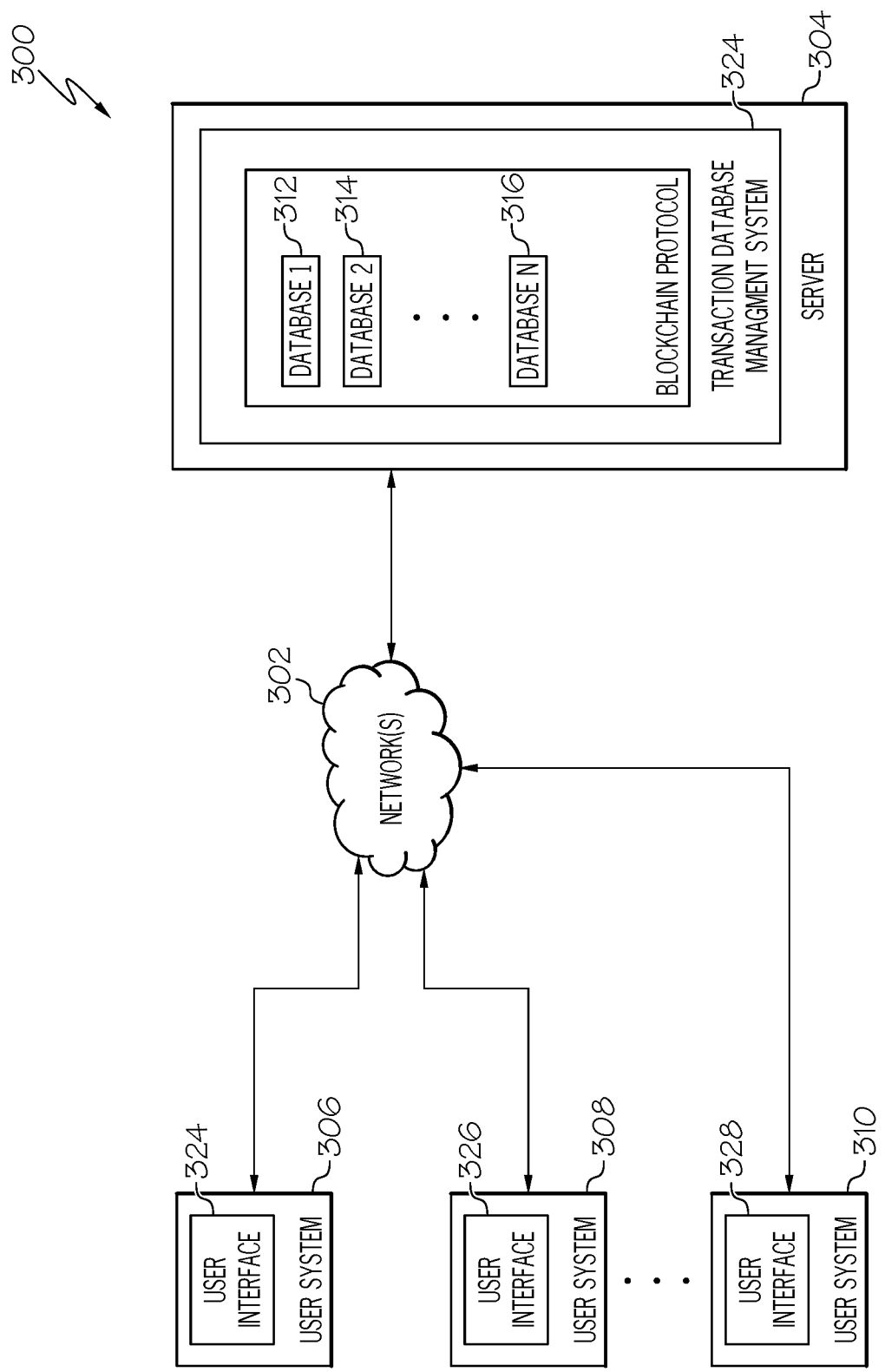
FIG. 3 a block diagram illustrating one example of an operating environment of the transactional database management system according to one example of the present invention.

FIG. 3 a block diagram illustrating one example of an operating environment of the transactional database management system 300 according to one example of the present invention.

The operating environment of FIG. 3 can be a cloud computing environment or a non-cloud computing environment. In a cloud computing environment, various embodiments of the present invention discussed below are provided as a service. FIG. 3 illustrates one or more networks 302 that, in one example, can include wide area networks, local area networks, wireless networks, and/or the like. The environment 300 includes a plurality of information processing systems 304, 306, 308, 310 that are communicatively coupled to the network(s) 302. The information processing systems 304, 306, 308, 310 include one or more servers 304 and one or more user systems 306, 308, 310. The user systems 306, 308, 310 can include, for example, information processing systems such as desktop computers, laptop computers, tablet-based computers, wireless devices such as mobile phones, personal digital assistants, and the like.

FIG. 3 further illustrates as part of the server system 304 a transactional database management system 324 communicating with one or more databases 312, 314, 316 using a blockchain protocol and communicatively coupled to the network 302. The database transaction is atomic, consistent, isolated, and durable (ACID). In some implementations is may be basically available, software state, eventual consistency (BASE).

The transactional database management system 324 may be a hierarchical type, a network structure type, a relational type, or a combination of these various types.

The block chain repository of FIGS. 1 and 2 are stored in stored in the database 316 being managed by the transactional database management system 324. Blocks that are records of the new transaction with additional data in the blockchain are added using within the transactional database management system 324 which is treated as coherent, independent of other changes to the transactional database management system, and only commits the new transaction into the transactional database management system if no errors occur otherwise the new transaction is rolled back and not committed into the transactional database management system.

Flow Diagram of Storing and Reading Content in a Blockchain

Figure 4:
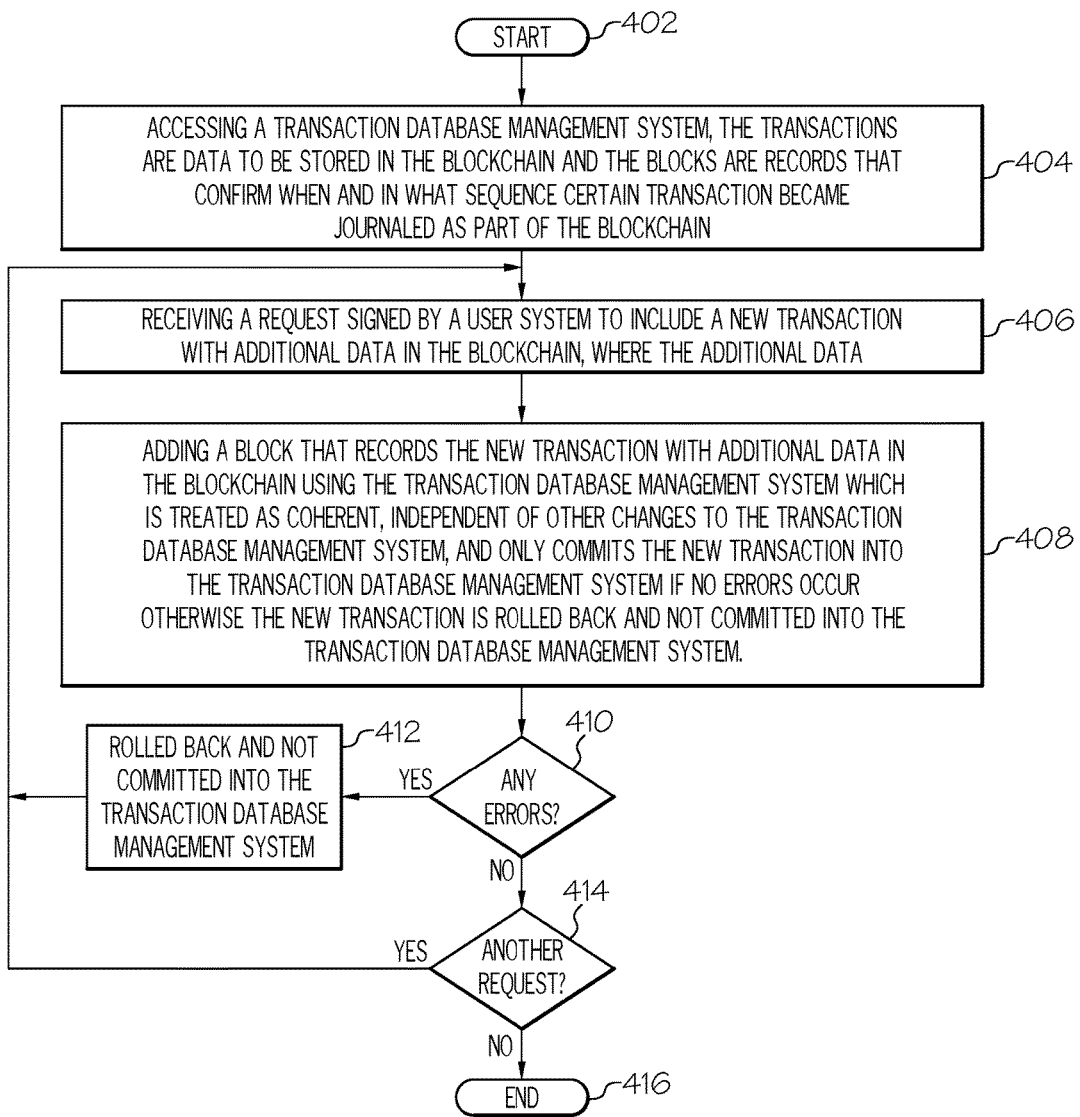
FIG. 4 is a flow diagram illustrating storing content in a blockchain with a transactional database management system by a user.

FIG. 4 is a flow diagram 400 illustrating storing content in a blockchain with a transactional database management system by a user. The process begins in step 402 and immediately proceeds to step 404. A computing node receives a request from a user or entity. The computing node is one of multiple computing nodes in a system using a blockchain protocol to share a transactional database management system. As described above, the transactions 250 are data to be stored in the blockchain 200 and the record blocks 210 are records that confirm when and in what sequence certain transaction became journaled as part of the blockchain 200.

Typically the request received is signed by a user system 306, 308, 310 to include a new transaction with additional data in the blockchain. In another example, the additional data may be divided into a plurality of sections and each of the sections, such as many separate songs in an album.

A category may be assigned to the additional data and the encryption key is associated with the category.

In step 408, a block or record block 210 is added that records the new transaction with additional data in the blockchain 200 within the transactional database management system 324. A transaction ID 218, 228, which is unique to each transaction in the blockchain is included. Optionally, a timestamp 214, 222, and/or category 216, 226 of the additional data is included 216, 226. Also, a hash 292 of a previous block 212, 290 combined with the current block 222 may be included as well to make tampering or changes to the blockchain 200 difficult.

A test is made in step 410 to determine if any errors are received from the transactional database management system 324. In the event there is an error occurs, the transaction is rolled back and not committed into the transactional database management system 324 as shown in step 412. Otherwise, in the case there are any errors that process continues to step 414.

A test is made in step 414 to see if there is another request from the user system 306, 308, 310 to include more data. If there is subsequent request, the process returns to step 406. Otherwise the process flow ends in step 416.

In the event a read request received with a transaction identifier 218, 228 from a user system 306, 308, 310 to access data journaled as part of a blockchain 200. The transactional database management system is searched using the identifier for a corresponding block in the blockchain 200.

In response to finding the corresponding block in the blockchain 200, the data is made available to the user system 306, 308, 310.

Generalized Computing Environment

Figure 5:
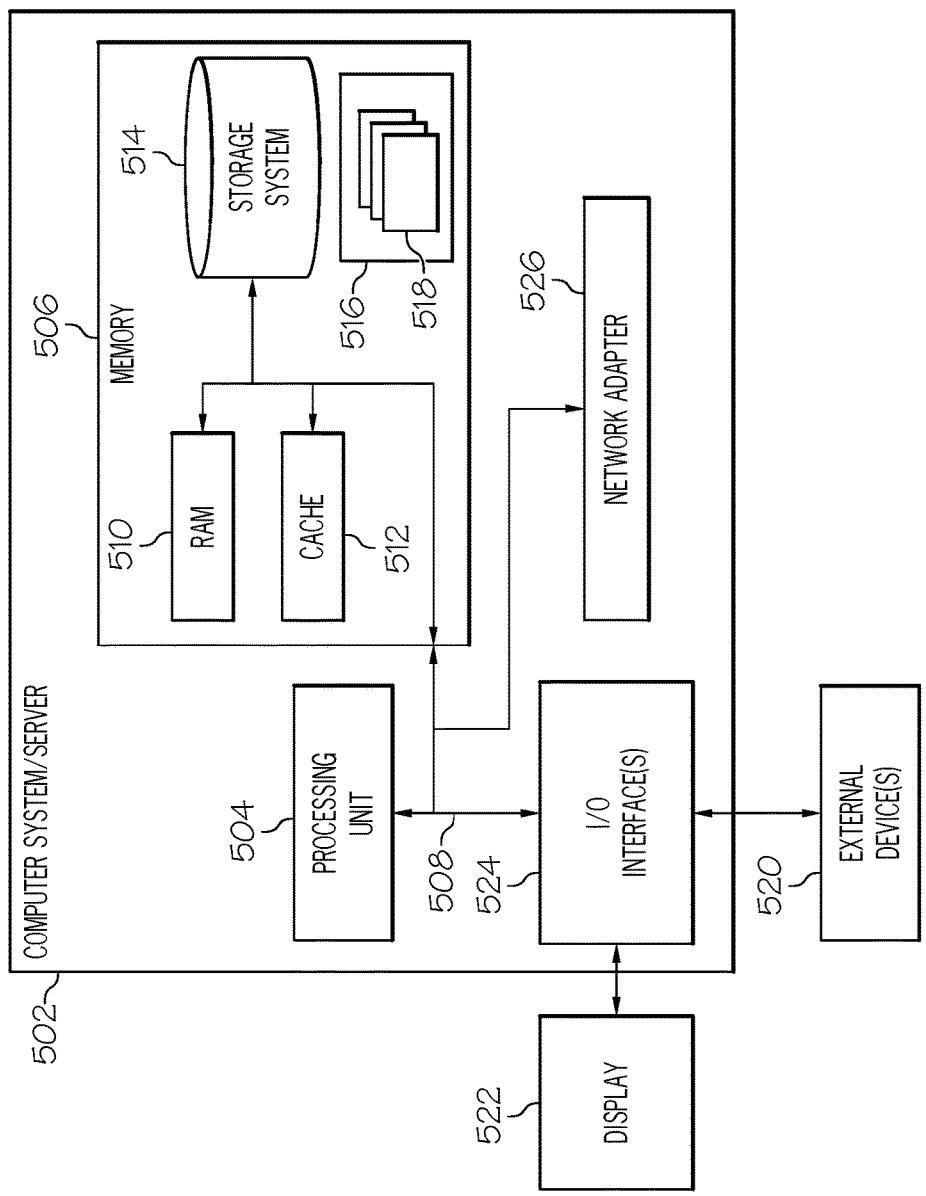
FIG. 5 illustrates one example of a computing or processing node for operating a node in a blockchain.

FIG. 5 illustrates one example of a computing or processing node 500 for operating a node in a blockchain. This is not intended to suggest any limitation as to the scope of use or functionality of embodiments of the invention described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus 508 that couples various system components including system memory 506 to processor 504.

Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506, in one embodiment, implements the flow diagram of FIG. 3 and the flow chart of FIG. 4. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of various embodiments of the invention.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 502 may also communicate with one or more external devices 1020 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-based method comprising:
    operating, by a processor, a transaction database management system with a plurality of user systems communicating with the transaction database management system using a blockchain protocol;
    storing, by the processor, for the plurality of user systems a plurality of transactions and blocks and their associated hash values and corresponding digital signatures in the transaction database management system in a blockchain;
    receiving, by the processor, a request from one of the plurality of user systems and a new transaction comprising additional data the request including a digital signature from the user system and a hash value of the new transaction;
    accessing, by the processor, the stored plurality of transactions and blocks and their associated hash values and corresponding digital signatures;
    verifying, by the processor, the digital signature from the one of the plurality of user systems and the hash value of the new transaction against the stored digital signatures and the stored hash values; and
    as a result of verifying, generating, by the processor, a block using the new transaction comprising the additional data and adding the block in the blockchain using the blockchain protocol by determining, by the processor, after the adding of the block, that there are no errors received from the transactional database management system and based on the determination, committing, by the processor, the new transaction to the transactional database management system.

2. The computer-based method of claim 1, wherein the transactional database management system is a hierarchical structure in which data is in a series of levels using nodes and branches, with each child node only having branched linked to one higher level parent node.

3. The computer-based method of claim 1, wherein the transactional database management system is a network structure in which data is using nodes and branches with each child node linked to multiple parent nodes.

4. The computer-based method of claim 1, wherein the transactional database management system is a relational structure in which data is in a series of related tables.

5. The computer-based method of claim 1, wherein the transactional database management system is a network structure in which data is using nodes and branches with each child node linked to multiple parent nodes with a relational structure in which data is in a series of related tables.

6. The computer-based method of claim 1, wherein the new transaction in the transactional database management system is atomic, consistent, isolated, and durable (ACID).

7. The computer-based method of claim 1, wherein the new transaction in the transactional database management system is basically available, software state, eventual consistency (BASE).

8. The computer-based method of claim 1, wherein the committing the new transaction to the transactional database management system that records the new transaction with additional data in the blockchain includes a hash of a previous block.

9. The computer-based method of claim 8, wherein committing the new transaction to the transactional database management system that records the new transaction with additional data in the blockchain includes a timestamp.

10. The computer-based method of claim 8, wherein the committing the new transaction to the transactional database management system that records the new transaction with additional data in the blockchain includes a transaction identifier.

11. The computer-based method of claim 1, further comprising:
receiving a request with a transaction identifier from a user system to access data journaled as part of the blockchain in the transactional database management system shared by all computing nodes participating in a system based on a blockchain protocol;
searching the transactional database management system using the transaction identifier for a corresponding block in the blockchain.

12. A system comprising:
a processor;
a memory storing computer readable instructions that when executed by the processor causes the processor to perform the steps of:
operating a transaction database management system with a plurality of user systems communicating with the transaction database management system using a blockchain protocol;
storing for the plurality of user systems a plurality of transactions and blocks and their associated hash values and corresponding digital signatures in the transaction database management system in a blockchain;
receiving a request from one of the plurality of user systems and a new transaction comprising additional data the request including a digital signature from the user system and a hash value of the new transaction;
accessing the stored plurality of transactions and blocks and their associated hash values and corresponding digital signatures;
verifying the digital signature from the one of the plurality of user systems and the hash value of the new transaction against the stored digital signatures and the stored hash values; and
as a result of verifying, generating a block using the new transaction comprising the additional data and adding the block in the blockchain using the blockchain protocol by determining after the adding of the block, that there are no errors received from the transactional database management system and based on the determination, committing the new transaction to the transactional database management system.

13. The system of claim 12, wherein the transactional database management system is a hierarchical structure in which data is in a series of levels using nodes and branches, with each child node only having branched linked to one higher level parent node.

14. The system of claim 12, wherein the transactional database management system is a network structure in which data is using nodes and branches with each child node linked to multiple parent nodes.

15. The system of claim 12, wherein the transactional database management system is a relational structure in which data is in a series of related tables.

16. The system of claim 12, wherein the transactional database management system is a network structure in which data is using nodes and branches with each child node linked to multiple parent nodes with a relational structure in which data is in a series of related tables.

17. The system of claim 12 wherein the new transaction in the transactional database management system is atomic, consistent, isolated, and durable (ACID).

18. The system of claim 12, wherein the new transaction in the transactional database management system is basically available, software state, eventual consistency (BASE).

19. A non-transitory computer readable medium storing computer executable instructions, that when executed by a processor causes the processor to perform the steps of:
operating a transaction database management system with a plurality of user systems communicating with the transaction database management system using a blockchain protocol;
storing for the plurality of user systems a plurality of transactions and blocks and their associated hash values and corresponding digital signatures in the transaction database management system in a blockchain;
receiving a request from one of the plurality of user systems and a new transaction comprising additional data the request including a digital signature from the user system and a hash value of the new transaction;
accessing the stored accessing, by the processor, the stored plurality of transactions and blocks and their associated hash values and corresponding digital signatures;
verifying the digital signature from the one of the plurality of user systems and the hash value of the new transaction against the stored digital signatures and the stored hash values; and
as a result of verifying, generating a block using the new transaction comprising the additional data and adding the block in the blockchain using the blockchain protocol by determining after the adding of the block, that there are no errors received from the transactional database management system and based on the determination, committing the new transaction to the transactional database management system.

* * * * *